United States Patent [19]

Shibayama et al.

[11] 4,338,077
[45] Jul. 6, 1982

[54] METHOD FOR CONTROLLING TEMPERATURE OF MULTI-ZONE HEATING FURNACE

[75] Inventors: Hiroshi Shibayama, Tokyo; Shinya Tanifuji, Hitachi; Yasuo Morooka, Hitachi; Kozo Nakai, Hitachi; Nobuyuki Togashi, Ibaraki, all of Japan

[73] Assignees: Nippon Kokan Kabushiki Kaisha; Hitachi, Ltd., both of Tokyo, Japan

[21] Appl. No.: 210,830

[22] Filed: Nov. 26, 1980

[30] Foreign Application Priority Data

Nov. 26, 1979 [JP] Japan .................. 54/152098

[51] Int. Cl.³ .............................. F27D 3/00
[52] U.S. Cl. ........................ 432/11; 266/80; 432/51
[58] Field of Search ............. 432/11, 51; 266/80

[56] References Cited

U.S. PATENT DOCUMENTS

| | | | |
|---|---|---|---|
| 3,604,695 | 9/1971 | Steeper | 432/11 |
| 3,695,594 | 10/1972 | Hollander | 432/11 |
| 4,255,133 | 3/1981 | Tanifuji et al. | 266/80 |
| 4,257,767 | 3/1981 | Price | 266/80 |

Primary Examiner—John J. Camby
Attorney, Agent, or Firm—Craig and Antonelli

[57] ABSTRACT

This invention relates to a method of controlling the temperature of a heating furnace which has at least one furnace zone capable of being controlled by heating means and which conveys materials to be heated, that are introduced thereinto, by conveyor means such as a walking beam or a pusher so that the materials are heated to a predetermined temperature until they are withdrawn from the discharge side.

More specifically, the present invention relates to a method of controlling set furnace zone temperature of the heating furnace when the materials to be heated, that are introduced into the heating furnace, have different temperature elevation patterns. The method of the invention is specifically characterized in that the predetermined set temperatures of each zone is used when the temperature elevation patterns of slabs are different with each other. The invention is directed to minimize the idle time inside the furnace when the materials having different temperature elevation patterns are sequentially introduced into the furnace, in order to conserve energy. The method is especially effective when the cold and hot materials are introduced into the furnace.

11 Claims, 25 Drawing Figures

| ADRC10 | PATTERN C1 |
|---|---|
| ADRC11 | $(T_{P1})_{C1}$ |
| ADRC12 | $(T_{P2})_{C1}$ |
| ADRC13 | $(T_{P3})_{C1}$ |
| ADRC14 | $(T_{P4})_{C1}$ |
| ADRCP1 | PATTERN C1 |
| ADC101 | $T_{PC1-1}$ |
| ADC102 | $T_{PC1-2}$ |
| ADC103 | $T_{PC1-3}$ |
| ⋮ | ⋮ |
| ADC120 | $T_{PC1-20}$ |

| ADRH30 | PATTERN H3 |
|---|---|
| ADRH31 | $(T_{P1})_{H3}$ |
| ADRH32 | $(T_{P2})_{H3}$ |
| ADRH33 | $(T_{P3})_{H3}$ |
| ADRH34 | $(T_{P4})_{H4}$ |
| ADRHP3 | PATTERN H3 |
| ADH301 | $T_{PH3-1}$ |
| ADH302 | $T_{PH3-2}$ |
| ADH303 | $T_{PH3-3}$ |
| ⋮ | ⋮ |
| ADH319 | $T_{PH3-19}$ |
| ADH320 | $T_{PH3-20}$ |

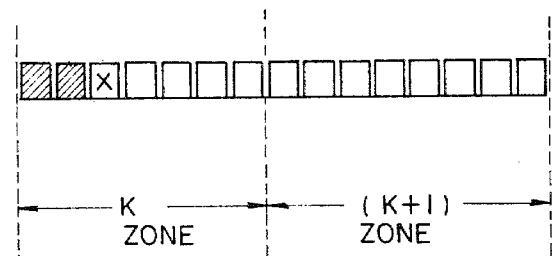
FIG. 6A
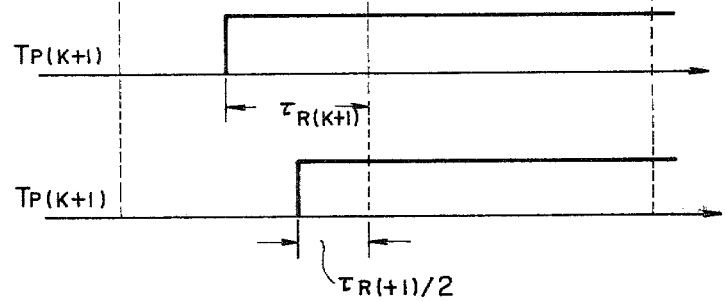
FIG. 6B
FIG. 6C
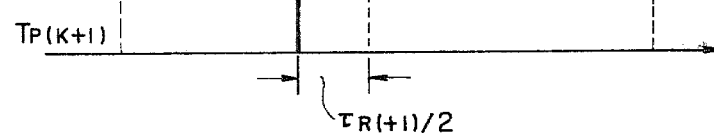
FIG. 5
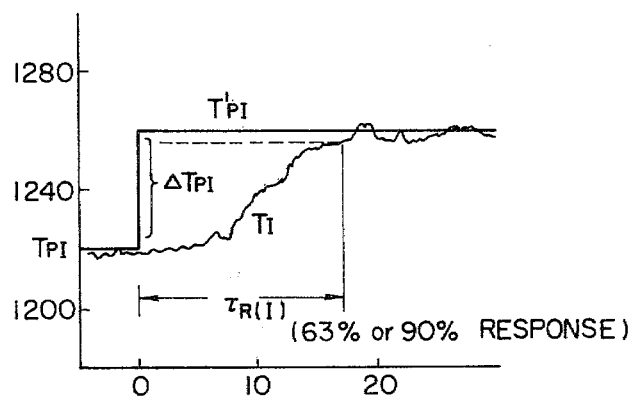

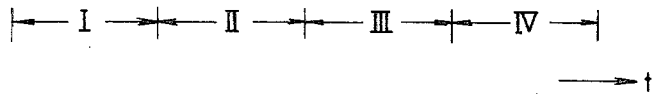
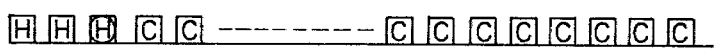
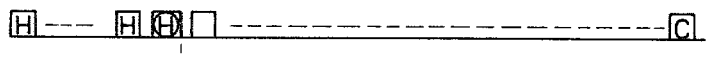
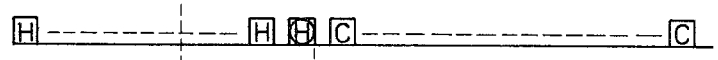
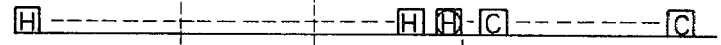
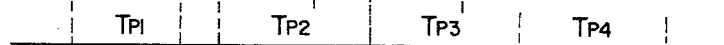
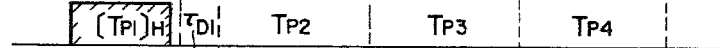
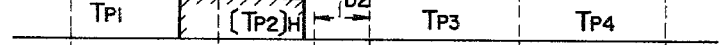
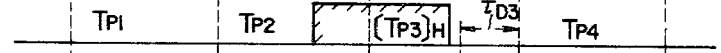
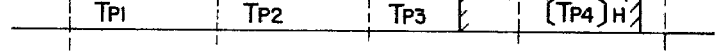
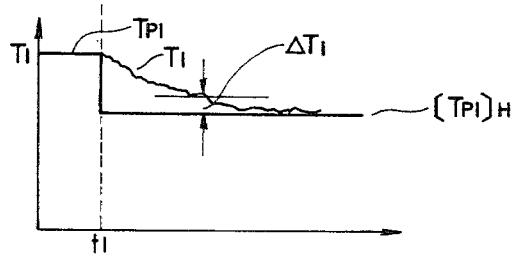
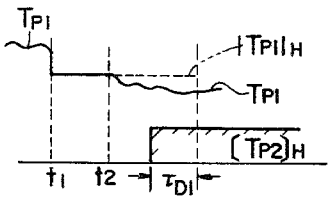

METHOD FOR CONTROLLING TEMPERATURE OF MULTI-ZONE HEATING FURNACE

BACKGROUND OF THE INVENTION

(1) Field of the Invention

This invention relates to temperature control of a furnace and more particularly, to a method of controlling a temperature of a heating furnace used for slabs prior to a hot rolling mill when the slabs having different temperature elevation patterns are continuously carried into the furnace.

In a heating furnace, control of the furnace temperature is effected generally in such a manner that the slabs carried into the furnace attain a target temperature before they are withdrawn from the furnace. Among the temperature control methods, there is a method which determines a temperature elevation pattern to the slabs with respect to their positions inside the furnace, and which performs heating of the slabs in accordance with this temperature elevation pattern it is surmised that this temperature elevation pattern varies with the charging temperature of the slabs, the target withdrawing temperature, the target withdrawing temperature, the residence time of the slabs in the furnace and their materials (kind of steel). The initial temperature of the slabs, for example, varies markedly, as will be described next.

In a hot strip mill, semi-finished metal products (e.g., slabs or thick plates) are stored in a storage zone called a steel bay until it is necessary to roll them. Hence, the slab temperature is substantially equal to the ambient temperature.

From the viewpoint of conserving energy, however, it is not desirable to cool the semi-finished products down to the ambient temperature and to heat them again at the time of rolling. Recently, hot slabs produced from the continuous casting process or blooming mill are heated in the furnace. However, cold slabs (hereinafter called "cold materials") unavoidably mix with the hot slabs for rolling when the slabs are carried to the furnace after their surface correction or when the requested kinds of products are different from the kinds of slabs supplied from the continuous casting line.

The temperature elevation pattern to the target temperature for heating the hot materials is different from that for heating the cold materials.

The present invention relates to a method of controlling the furnace temperature of a furnace when the materials having different temperature elevation patterns such as the abovementioned hot and cold materials are continuously carried into the heating furnace.

(2) Description of the Prior Art

Most of the prior art does not mention the temperature control of slabs having different temperature elevation patterns such as the hot materials and the cold materials described above.

As the prior art relating to the temperature control of a furnace, mention can be made of U.S. Pat. No. 3,604,695 entitled "Method and Apparatus for Controlling a Slab Reheat Furnace". This prior art estimates the average temperature of the slabs distributed in plural furnace zones as a function of temperatures measured in the zones, heat characteristics and size of the slabs, positions of the slabs in the zones and so on, and carries out heating in order to minimize the deviation of the estimated temperature from the desired slab temperature patterns. The reference does not teach or suggest anything about the correction of the set temperature when the charged slab temperature varies greatly.

SUMMARY OF THE INVENTION

A primary object of the present invention is to provide a novel method of controlling the temperature of a heating furnace into which slabs having different temperature elevation patterns are being carried.

It is another object of the present invention to provide a novel method of controlling the temperature of a heating furnace which method makes it possible to continuously pattern from preceeding slabs having a given temperature elevation pattern.

To accomplish these objects, the present invention is charcterized in that when introduction of slabs having a different temperature elevation pattern is detected during introduction of slabs into a heating furnace, the set temperature of the heating furnace is changed over afresh to a value suited for the slabs introduced subsequently.

It is another characterizing feature of the present invention that the set value for each zone of the furnace is changed over at a timing corresponding to the movement of a leading slab of a group of slabs having a different temperature elevation pattern.

BRIEF DESCRIPTION OF THE DRAWINGS

FIG. 5 shows an example of the response time of the furnace zone;

FIGS. 6A and 6C show the timings for changing the set values with respect to the slab positions;

FIG. 8(a) shows the furnace zones, FIGS. 8(b) through 8(e) show the positions of the corresponding slabs, FIGS. 8(f) through 8(j) show the timing for the set temperatures, and FIGS. 8(k) and 8(l) show the timings for releasing the lock on the set values.

DESCRIPTION OF THE PREFERRED EMBODIMENTS

Hereinafter, preferred embodiments of the present invention will be described. Though the following description deals with the case where a material heated is a slab, the present invention is not particularly limited to the slabs but can be applied to other steel materials.

Figure 1:
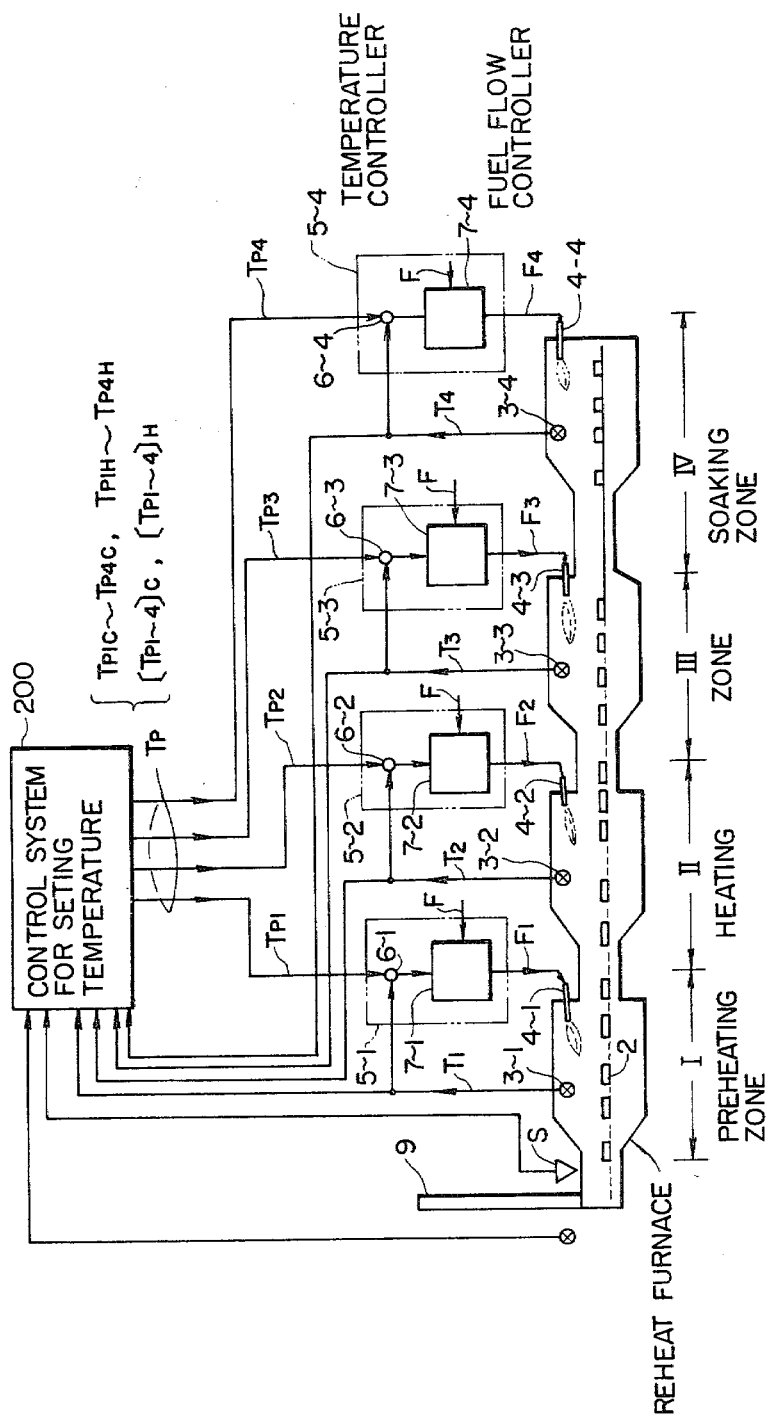
FIG. 1 is a block diagram of the construction of the heating furnace and the control system.

FIG. 1 shows diagrammatically the construction of a heating furnace and the control system in accordance with the present invention. Reference numeral 1 represents the heating furnace as a whole. In the embodiment the heating furnace is a 4-zone type heating furnace in which I represents a preheating zone, II and III represent heating zones and IV a soaking zone. Reference numerals 3-1 through 3-4 represent furnace zone temperature detectors that are provided in the respective zones.

Reference numerals 4-1 through 4-4 represent fuel burners provided in the respective zones and 5-1 through 5-4 represent minor furnace temperature controllers. Reference numerals 6-1 through 6-4 represent operational devices for determining the difference between the furnace temperatures detected by the detectors 3-1 through 3-4 and furnace temperature set values $T_P$ (Tp-1 through Tp-4), respectively. Reference numerals 7-1 through 7-4 represent fuel flow controllers that control the fuel flow F, respectively. Reference numeral 200 represents a furnace temperature control system while reference numeral 9 represents an exhaust stack. Reference numeral 2 represents a slab to be heated. In other words, FIG. 1 shows a 4-zone type heating furnace in which the temperature control for each zone I through IV is independently carried out.

Namely, the fuel control is effected by the fuel flow controllers (7-1 through 7-4) in such a fashion that the actual furnace temperature in each zone coincides with the output (Tp-1 through Tp-4) from the control system for setting the furnace temperature 200. Symbol F represents a fuel and $F_1$ through $F_4$ represent fuel flow in the zones I through IV, respectively.

The conventional apparatus for setting the furnace temperature calculates the value of the slab temperature in the furnace using the temperature detection values T1–T4 in the zones and adjusts the setting value of the furnace temperature so that the difference between the target value determined by the temperature elevation pattern of the slab and the slab temperature is minimized. In accordance with this kind of system, the response speed of the furnace temperature control is affected by the change speed of the slab temperature. The time constant of this slab temperature is frequently in the order of scores of minutes so that the furnace temperature control is effected slowly in accordance with the constant. The system is suited for stable control when materials having substantially the same heating conditions ("steady states") are to be heated, but when materials having remarkably different heating conditions ("unsteady states") are to be heated, the control accuracy of the slab temperature is markedly deteriorated due to the response delay.

Figures 2A, 3C:
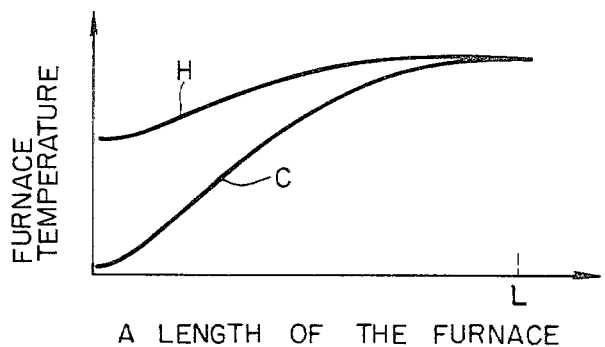
FIG. 2A shows an example of the temperature elevation pattern for the hot materials and FIG. 2B shows the block diagram of the set temperature calculation apparatus for the furnace in accordance with the present invention.
FIG. 3C shows an example of the set value memory.

When a cold material is subsequently charged after a hot material, for example, the response delay becomes especially critical. FIG. 2A shows examples of the temperature elevation patterns of such hot and cold materials. In the abovementioned embodiment, the atmosphere inside the furnace is controlled at first in such a manner as to heat the hot material along the curve H in FIG. 2A because the great majority of the steel plates in the furnace are the hot materials at the beginning. As the number of cold materials increases, however, it becomes necessary to change the temperature of the atmosphere inside the furnace so as to be suitable for heating the cold materials. In other words, heating along the curve C in FIG. 2A becomes necessary. A critical problem here is that the control accuracy of the slabs before and after the boundary slab drops when the temperature atmosphere inside the furnace is thus changed.

That is to say, when the hot charge materials are heated with the temperature pattern for the cold materials, they are over-heated while if the cold charge materials are heated with the temperature elevation pattern for the hot charge materials, they are heated insufficient heating, it is necessary to bring the furnace temperature close to the optimum value of each material as rapidly as possible. In accordance with the conventional system, however, since the furnace temperature correction is effected by means of the time constant of change of the slab temperature as described above, over-heating or insufficient heating of the slab unavoidably occurs.

Figure 2B:
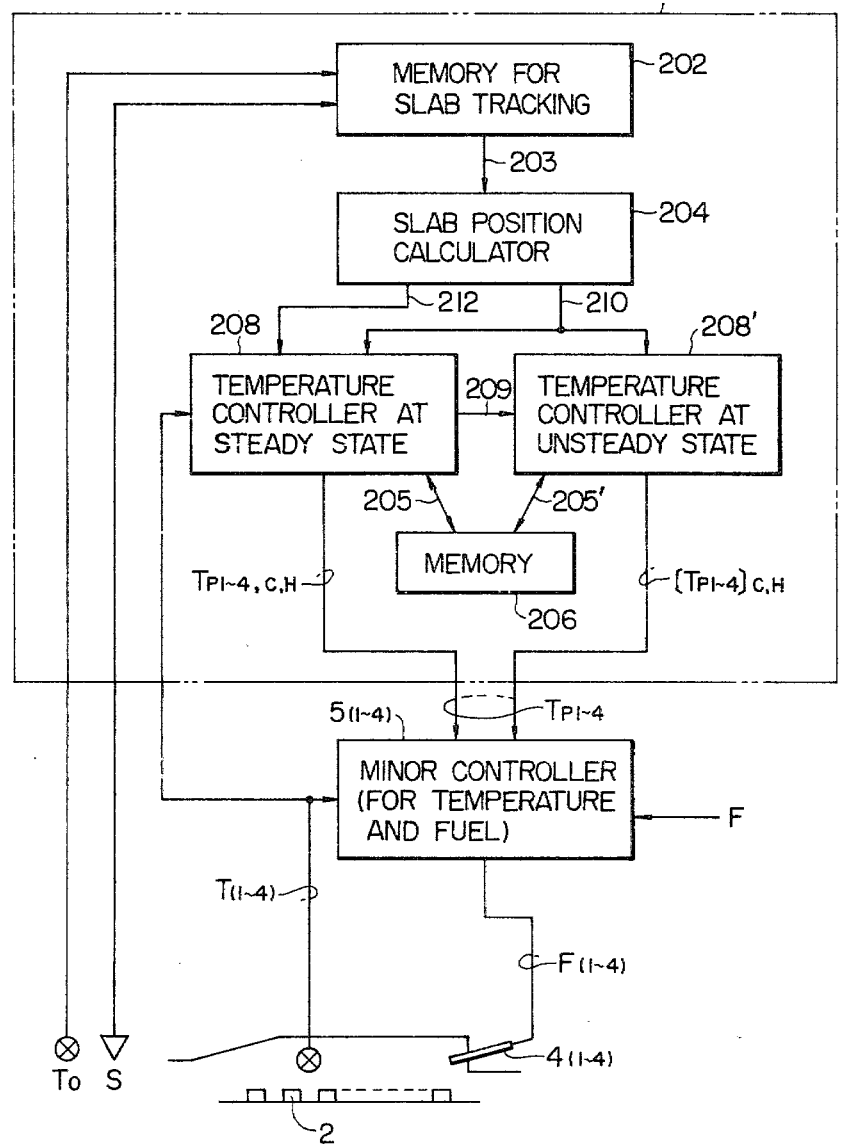

FIG. 2B is a block diagram of the control system 200 for setting the furnace temperature for explaining the present invention. In the drawing, reference numeral 3(3-1 through 3-4) represents a furnace temperature detector, 4(4-1 through 4-4) is a burner for supplying an air-fuel mixture and 5(5-1 through 5-4) is a minor controller, as in FIG. 1.

Figure 3A:
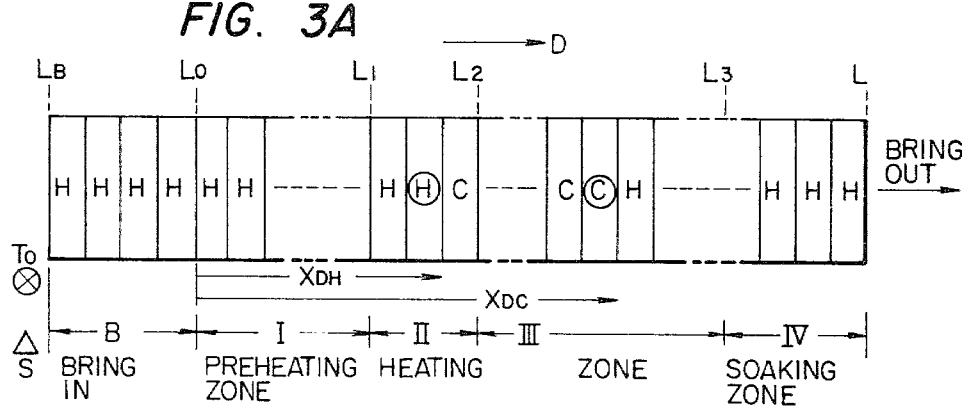
FIG. 3A shows an example of the tracking file memory.

Reference 202 represents a memory for tracking the slabs inside the furnace and forms a data file in accordance with each slab position. It is a memory file which detects the movement of a walking beam (or pusher) by an operation pitch detector S and shifts the memory content in the direction represented by arrow D such as shown in FIG. 3A, for example. This memory file enables an operator of the furnace to ascertain which slab is now located at which position inside the furnace. The data for a slab or slabs withdrawn from the furnace is deleted from the file but this data can be used for other tracking purposes on rolling lines subsequent to the furnace output.

FIG. 3A diagrammatically shows the case where hot materials H are first charged and then cold materials C are charged, followed by another group of hot materials H. Symbols Ⓒ and Ⓗ represent the leading cold and hot materials, respectively, and they are hereinafter called "boundary slabs". Even when slabs are carried into the furnace while the furnace is empty, the leading slabs are called the "boundary slabs". A catalog to the tracking file is made as the operator instructs the catalog to the file when the slabs are carried into the furnace. Alternatively, automatic registration may be made including distinction of the hot materials from the cold materials by means of slab temperature detectors disposed at the furnace inlet.

Figure 3B:
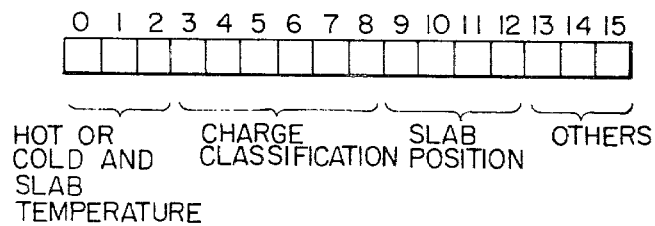
FIG. 3B shows an example of the data structure per slab of the file memory.

Reference numeral 204 represents a slab position calculator which manages the slabs by means of the slab position data of the aforementioned tracking file, charge classification data and sitrinction data between the hot materials and the cold materials. These slab data are memorized by alloting each bit to the data as shown in FIG. 3B, for example. Namely, FIG. 3B shows case where 16 bits are alloted to each slab, and the tracking file data are also the abovementioned three kinds. If necessary, however, other data may also be added. The slab position calculator 204 manages the slabs inside the furnace on the basis of the file data. The aforementioned boundary slabs are Ⓒ and Ⓗ shown in FIG. 3A, and tracking of these boundary slabs is indispensable for correcting the temperature elevation patterns of the slab groups.

The slab position calculator 204 calculates the distance $X_{DC}$ of the boundary slab Ⓒ from the furnace inlet, for example, on the basis of the tracking file data, ordinarily, the number of the boundary slabs that are simultaneously present in the furnace is two at the most.

The slab position calculator 204 further determines to which furnace zone $K_D$ the boundary slabs belong. Generally, judgement is made from the distance $X_D$ from the furnace inlet. In FIG. 3A, for example, the judgement is made in the following manner;

when $L_1 < X_{DH} < L_2 \rightarrow K_D = II$ when $L_2 < C_{DC} < L_3 \rightarrow K_D = III$.

In FIG. 3A, L represents the entire length of the heating furnace and $L_1$ through $L_3$ represent the distances from the furnace inlet to each zone outlet, respectively.

The slab position calculator recognizes whether the boundary slab exists or doesn't in any heating zone, and sends the information to controllers 208 and 208'. If the boundary slab doesn't exist in any zone, the set temperature of that zone is determined in the controller 208. On the other hand, if exist, it is determined in the controller 208'. The signal 210 represents this control selection and $K_D$.

The memory 206 memorizes the temperature elevation pattern of the slab. In this memory the target slab temperatures at 20 furnace positions in the furnace are memorized in the form such as shown in FIG. 3C. For instance, the values Tpc1-1 through Tpc1-20 are represented by the 20 values of the pattern $C_1$. The memory values of these patterns are sent to the temperature controller 208 as the signal 205. The pattern $C_1$ in FIG. 3C corresponds to the temperature elevation pattern $C_1$ of the cold materials in FIG. 4, for example. This also holds true of the patterns $C_2$, $C_3$ and $H_1$ through $H_3$.

Figure 4:
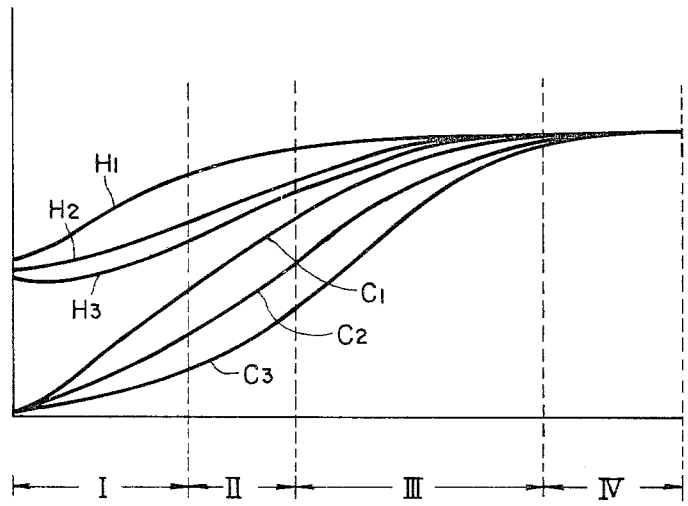
FIG. 4 shows an example of the temperature elevation patterns for the hot material and the cold material.

The controller 208 is used in the steady state. The conventional control method can be applied to the controller 208, which is represented in commonly assigned U.S. patent application Ser. No. 28,705 (filed Apr. 10, 1979) entitled "METHOD FOR CONTROLLING FURNACE TEMPERATURE OF MULTI-ZONE HEATING FURNACE", now U.S. Pat. No. 4,255,133 (issued Mar. 10, 1981), for instance. In this controller, optimum temperature elevation pattern, which corresponds to any curve in FIG. 4, is chose from the memorized patterns in 206. The set temperatures of the heating zones are determined so as to make the slab temperature follow the chosen pattern.

The output signal Tp1-4, C,H of the block 208 in FIG. 2B represents the set values of each zone temperature and they are given to the minor controller 5(1~4). On the other hand, the controller 208' is used in unsteady state. In other words, 208' is used, when the boundary slab exist in any heating zone. The memory 206 memorizes setting value of the zone temperature in the form such as shown in FIG. 3C. In FIG. 3C, $ADRC_{10}$, $ADRC_{11}$ . . . represent memory addresses while $[Tp1]C1$, $[Tp2]C2$ . . . represent the set temperatures in the zones corresponding to the slab elevation patterns.

When the elevation pattern is determined in the controller 208, an index signal, which represent the pattern, is send to the controller 208' as a signal 209. The controller 208' is select the setting temperature of the unsteady zone from the memory 206 according to the index signal 209. This selection is represented as 205' in FIG. 2B.

Next, the furnace temperature setting timing in each zone in 208' will be explained. Here, the timing for setting the furnace set temperature is determined using the boundary slab position $X_D$ calculated by the aforementioned slab position calculator 204 and the furnace zone number $K_D$ to which the boundary slab belongs.

When the response time of the furnace temperature in each zone is extremely fast, the set value can be changed when the boundary slab reaches the entrance of each furnace zone. In practice, however, the response time is not a negligible value. FIG. 5 shows an example of the response of the furnace zone temperature when the set temperature TpI of the furnace zone I, is changed stepwisely by ΔTpI. The response of the furnace zone temperature $T_I$ can be regarded as a response characteristic of the first order delay including the dead time. Here, the time until 90% of the change ΔTpI, that is, τR(I) in FIG. 5, is defined as the response time of the zone I. It is necessary to determine the timing for setting the zone temperature in consideration of this response time. Here we suppose the response time for each of the zones II–IV as τR(II), τR(III) and τR(IV), and the boundary slab is now supposed to belong to the zone K as showed in FIG. 6A. We explain the timing of the setting in 208' by using FIG. 6. FIG. 6B shows the timing for correcting the set temperature Tp(k+1) of the (k+1)th zone. In other words, FIG. 6B shows the case where Tp(k+1) is to be corrected earlier by τp(k+1) than the timing when the boundary slab arrives at the inlet of the (k+1)th zone by τp(k+1) while FIG. 6C shows the case where Tp(k+1) is to be corrected in advance by p(k+1)/2. When the zone temperature is corrected by taking the timing into account in this manner, a desired furnace temperature can be attained when the boundary slabs reaches the furnace zone. The timing may be varied in accordance with the response time of the furnace.

Figure 7:
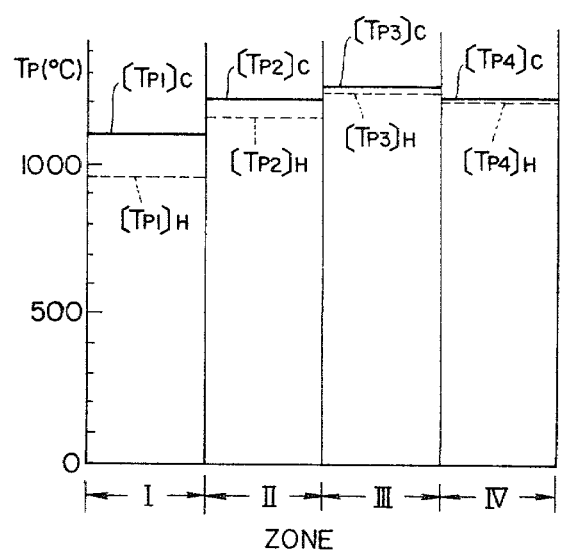
FIG. 7 shows examples of the set values corresponding to each zone for the hot material and for the cold material.

FIG. 7 shows an example of the set temperature values of the furnace zones, respectively. [Tp1]C through [Tp4]C represent the set temperatures for the zone 1 through 4 for the cold material and [Tp1]h through [Tp4]h likewise represent the set temperatures for the hot material.

This is an example when 200 mm-thick steel is heated to 1,200° C., within 3 hours. The temperature of the slab to be carried into the furnace is 450° C. for the hot material and 30° C. for the cold material. The withdrawing temperature from the furnace is 1,200° C. for both hot material and cold material, and the temperature for the cold material is set considerably higher than that for the hot material.

Next, a case will be described in which the cold materials are first carried into the furnace and then the hot materials. The set temperatures of the heating zones are determined by the controller 208 until the hot material is charged in the furnace, and we assume the values as Tp1 through Tp4. When the leading slab of the hot materials, that is, the boundary slab, is detected at the inlet of the first zone, the set temperature in the first zone is changed from Tp1 to [Tp1]h, in the case of FIG. 7, [Tp1]h=960° C. Referring now to FIG. 8, symbols I through IV in FIG. 8(a) represent the zones I through IV. FIG. 8(b) shows the distribution of the slabs inside the furnace where C represents the cold material, Ⓗ does the hot materials and H does the leading slab of the hot materials, that is, the boundary slab. FIG. 8(b) shows the state where the boundary slab enters the first zone I, FIG. 8(f) shows the set temperature in the case where only the cold materials are present inside the furnace. When the boundary slab is detected at the entrance of the first zone I, that is, under the state shown in FIG. 8(b), the set temperature of the first zone I is changed from Tp1 to [Tp1]h as shown in FIG. 8(g). The set furnace temperature of the second zone II is corrected from Tp2 to [Tp2]h=1160° C. While the boundary slab Ⓗ is still present in the first zone I, as shown in FIG. 8C and FIG. 8H, at the timing of $\tau D1 = \tau R(II)/2$, where the time $\tau D1$ required for the Ⓗ slab to reach the entrance of the second zone II is calculated sequentially in accordance with the equation (3) from the slab moving speed and the distance.

Similarly, the set temperature for the third and fourth zones III, IV are made beforehand while the boundary slab is still present in the second and third zones II and III, respectively, and their timings are $\tau D2 = \tau R(II)/2$ and $\tau D3 = \tau R(IV)/2$, respectively. The new set temperatures are $[Tp3]h = 1,240°$ C. and $[Tp4]h = 1,210°$ C., respectively (see FIG. 7). FIG. 8(d) shows the timing for correcting the set temperature of third zone while FIG. 8(e) shows that of fourth zone.

When the charge of the hot or cold materials is thus detected at the inlet of the furnace, tracking inside the furnace is effected on the basis of the detected data and the correction of the furnace temperature is effected in advance of the slab movement in consideration of the heat response characteristic of each furnace zone at the timing shown in FIG. 8.

Next, the timing for lock release of each zone will be described. First, the case of the first zone I will be explained with reference to FIG. 8(k). If the temperature pattern is changed from the ordinary set temperature $Tp1$ for the cold materials to $[Tp1]h$ upon detection of the leading slab (Ⓗ detection) at the time $t_1$, the furnace temperature $T_1$ in the first zone I changes gradually and finally reaches $[Tp1]h$. The lock is released at the timing when the difference $\Delta T1$ between $T1$ and $[Tp1]h$ becomes equal to, or smaller than, a predetermined value $\Delta \epsilon 1$, that is, at the timing which satisfies the relation $\Delta T_1 \leq \Delta \epsilon 1$, and the temperature control for the ordinary hot materials is then effected.

Here, $t_2$ represents the timing that satisfies the above-mentioned relation $\Delta T1 \leq \Delta \epsilon 1$ and at this timing, the lock is released and the set value $Tp1$ is determined by the steady state algorithm. At the timing $\tau D1$, the set value for the second zone II is corrected to $[Tp2]h$. The lock release holds true also for the second through the fourth zones II–IV. They are expressed by the following general formulas, respectively:

$$T_1 \sim [T_{p1}]_{h,c} = \Delta T_1 \leq \Delta \epsilon_1 \quad (4)$$
$$T_2 \sim [T_{p2}]_{h,c} = \Delta T_2 \leq \Delta \epsilon_2$$
$$\vdots \qquad \vdots \qquad \vdots$$
$$T_4 \sim [T_{p4}]_{h,c} = \Delta T_4 \leq \Delta \epsilon_4$$

Namely, the lock release is made at each of the above-mentioned timings. (In the same way as in FIG. 5, 63% response or 90% response may also be employed). The lock may be released sequentially from the first zone to the fourth zone.

Figure 9:
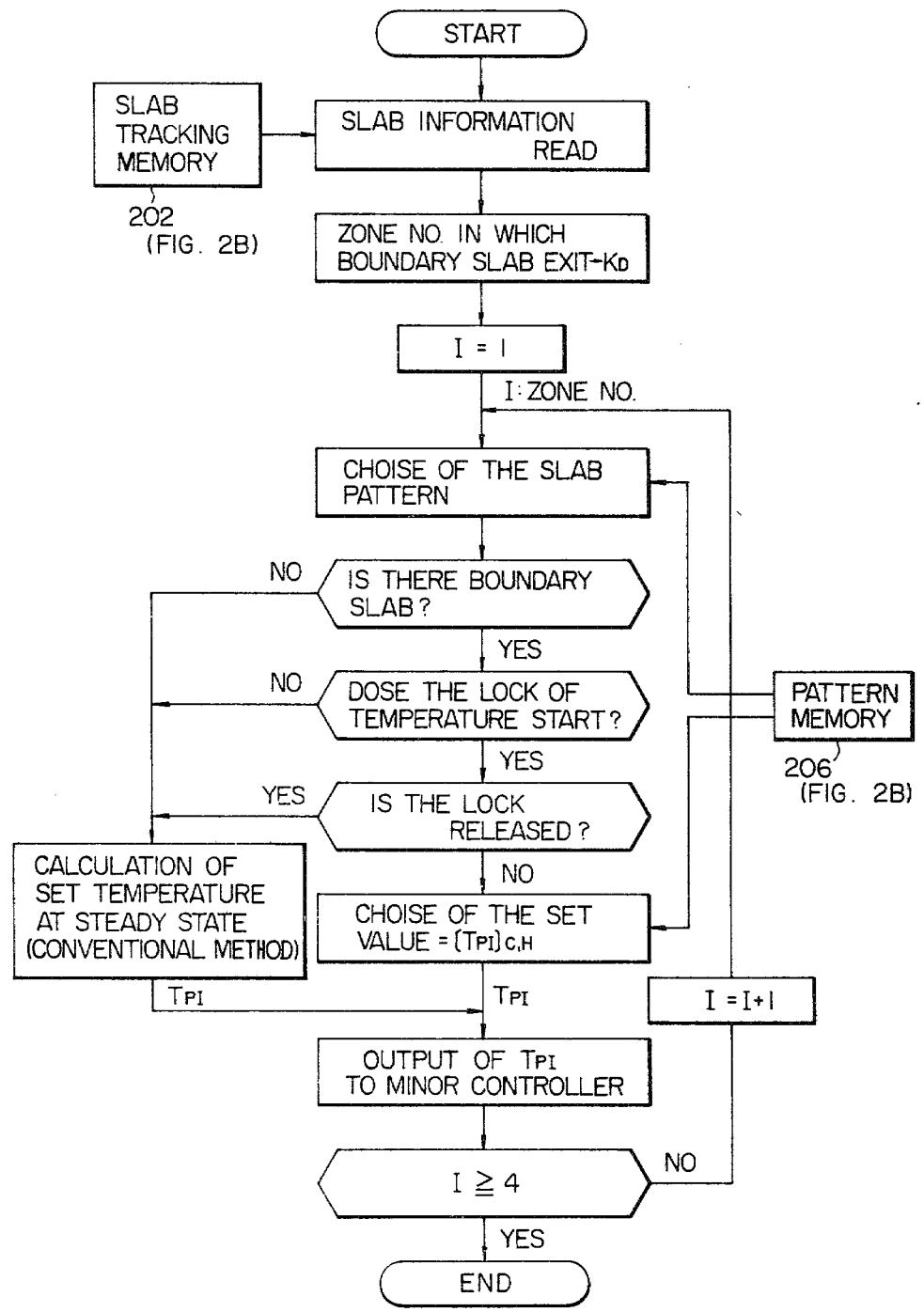
FIG. 9 shows the flow chart for practising the method of the present invention by use of a computer.

A flow chart for practising the furnace zone temperature set control using a computer is shown in FIG. 9.

In the foregoing embodiment shown in FIG. 5, the response time of the furnace temperature is defined as the 90% response, but the response time may be a 63% response. Selection of these values is determined in conjunction with the furnace operation schedule and the like. More generally, $\tau Di$ of the ith zone is determined in accordance with the response of the (i+1)th zone. The optimum value should be selected in accordance with the furnace characteristics. At times, a constant value may be selected irrespective of the furnace characteristics.

What is claimed is:

1. In a method of controlling the temperature inside a heating furnace having at least one furnace zone capable of being controlled by heating means and while conveying and heating therein materials to be heated that are introduced thereinto, withdrawing said materials to be heated after they are heated to a predetermined temperature, a method of controlling the temperature of a heating furnace comprising:

memorizing sequentially specific data of said materials to be rolled that are introduced into said heating furnace;

shifting and memorizing said memory values in accordance with the conveying operation of conveyor means inside said heating furnace;

setting a furnace zone temperature in accordance with movement of said materials to be heated;

attaining said furnace zone temperatures set in the preceding temperature setting step by controlling the furnace zone temperatures with said heating means of said furnace zones;

changing the set temperature of said furnace zones in accordance with the position of a leading boundary material of plural materials having different temperature elevation patterns from those of said plural materials to be heated that are sequentially introduced; and attaining the changed furnace zone temperatures set in the preceding temperature set changing step by controlling the furnace zone temperatures with said heating means of said furnace zones.

2. The method of controlling a temperature of a heating furnace as defined in claim 1, wherein the set temperature of said furnace zone is changed in the set temperature changing step to such values as are suited for plural materials to be heated, including said boundary material to be heated, when said boundary material enters said furnace zones.

3. The method of controlling a temperature of a heating furnace as defined in claim 1, wherein the set temperatures of said furnace zones are changed in the set temperature changing step to such values as suited for plural materials to be heated subsequent to said boundary material to be heated, before said boundary material enters said furnace zones.

4. The method of controlling a temperature of a heating furnace as defined in claim 3, wherein the set temperatures of said furnace zones are changed in the set temperature changing step to such values as suited for plural materials to be heated subsequent to said boundary material to be heated, in advance by a predetermined period of time before said boundary material enters said furnace zones.

5. The method of controlling a temperature of a heating furnace as defined in claim 3, wherein the set temperatures of said furnace zones are changed in the set temperature changing step to such values as are suited for plural materials to be heated subsequent to said boundary material to be heated, in advance by a heat response time of said furnace zones before said boundary material enters said furnace zones.

6. The method of controlling a temperature of a heating furnace as defined in claim 3, wherein the set temperatures of said furnace zones are changed in the set temperature changing step to such values as suited for plural material to be heated, in advance by a 90% heat response time of said furnace zones before said boundary material enters said furnace zones.

7. The method of controlling a temperature of a heating furnace as defined in claim 3, wherein the set temperatures of said furnace zones are changed during the set temperature changing step to such values as suited for plural materials to be heated subsequent to said boundary material to be heated, in advance by a 63% heat response time of said furnace zones before said boundary material enters said furnace zones.

8. The method of controlling a temperature of a heating furnace as defined in claim 1, wherein the changed value of the temperature set is released when a difference signal between the changed set furnace temperature and the measured furnace temperature becomes smaller than a predetermined value, and thereafter steady temperature control on the basis of said temperature elevation patterns is resumed.

9. The method of controlling a temperature of a heating furnace as defined in claim 1, wherein the changed value of the temperature set is release after the passage of response time of said furnace zones from the set time of the change, and thereafter the steady temperature control on the basis of said temperature elevation patterns is resumed.

10. The method of controlling a temperature of a heating furnace as defined in claim 1, wherein the plural materials to be heated have at least one hot material and one cold material.

11. The method of controlling of a heating furnace according to claim 1, wherein the step of changing the set temperature in accordance with the position of a leading boundary material is performed based upon information obtained by tracking the location of said boundary material.

* * * * *